Dec. 25, 1928.　　　　　　　　　　　　　　　　　　　1,696,533
F. W. GAGE ET AL
FILM SIGNALING DEVICE FOR CAMERAS
Filed April 20, 1926　　　3 Sheets-Sheet 1

Inventor
FRED W. GAGE
ALBERT W. TONDREAU
By Munn & Co.
Attorney

Dec. 25, 1928.  1,696,533
F. W. GAGE ET AL
FILM SIGNALING DEVICE FOR CAMERAS
Filed April 20, 1926     3 Sheets-Sheet 2
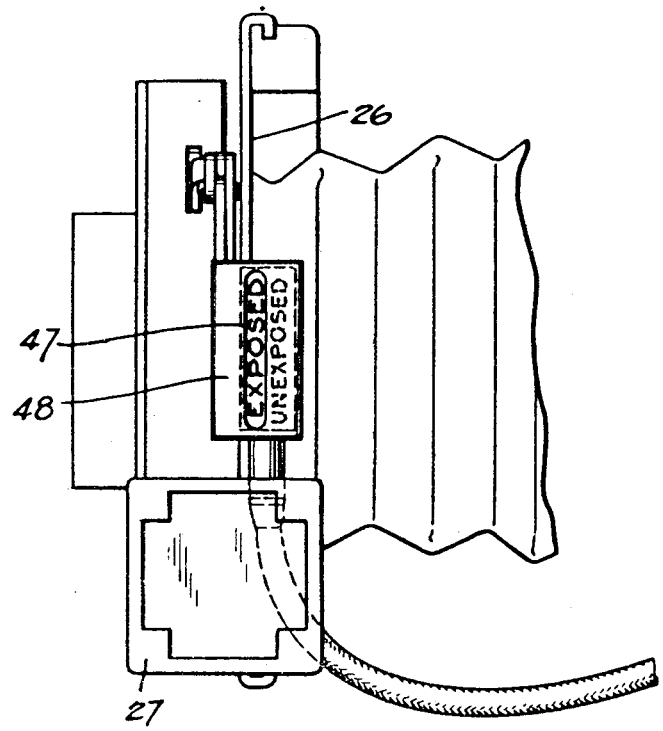
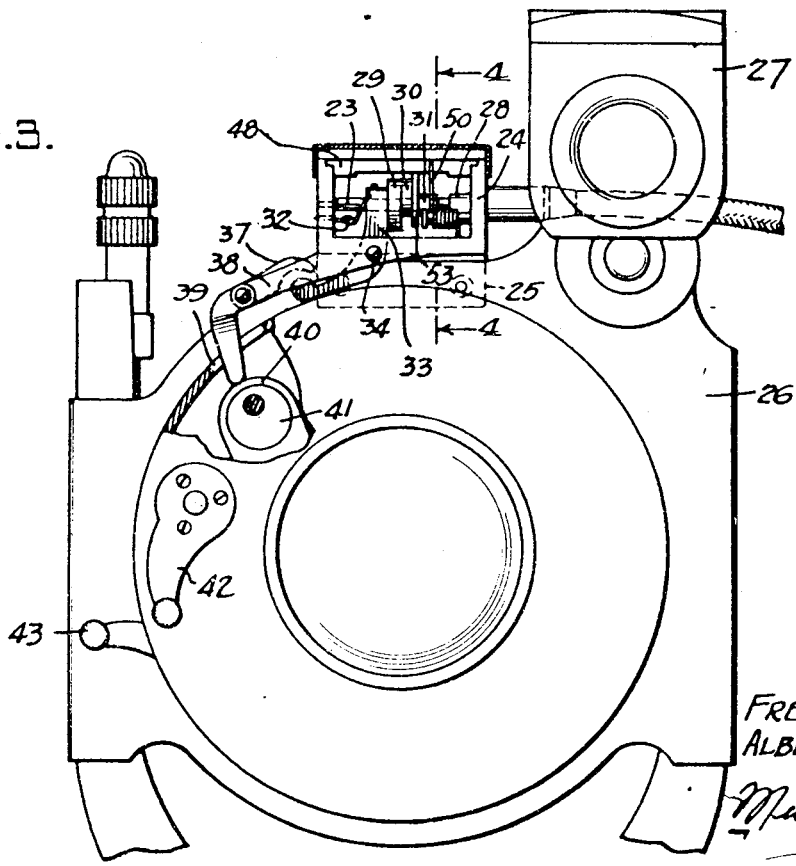
Inventors
FRED W. GAGE
ALBERT W. TONDREAU
Attorney

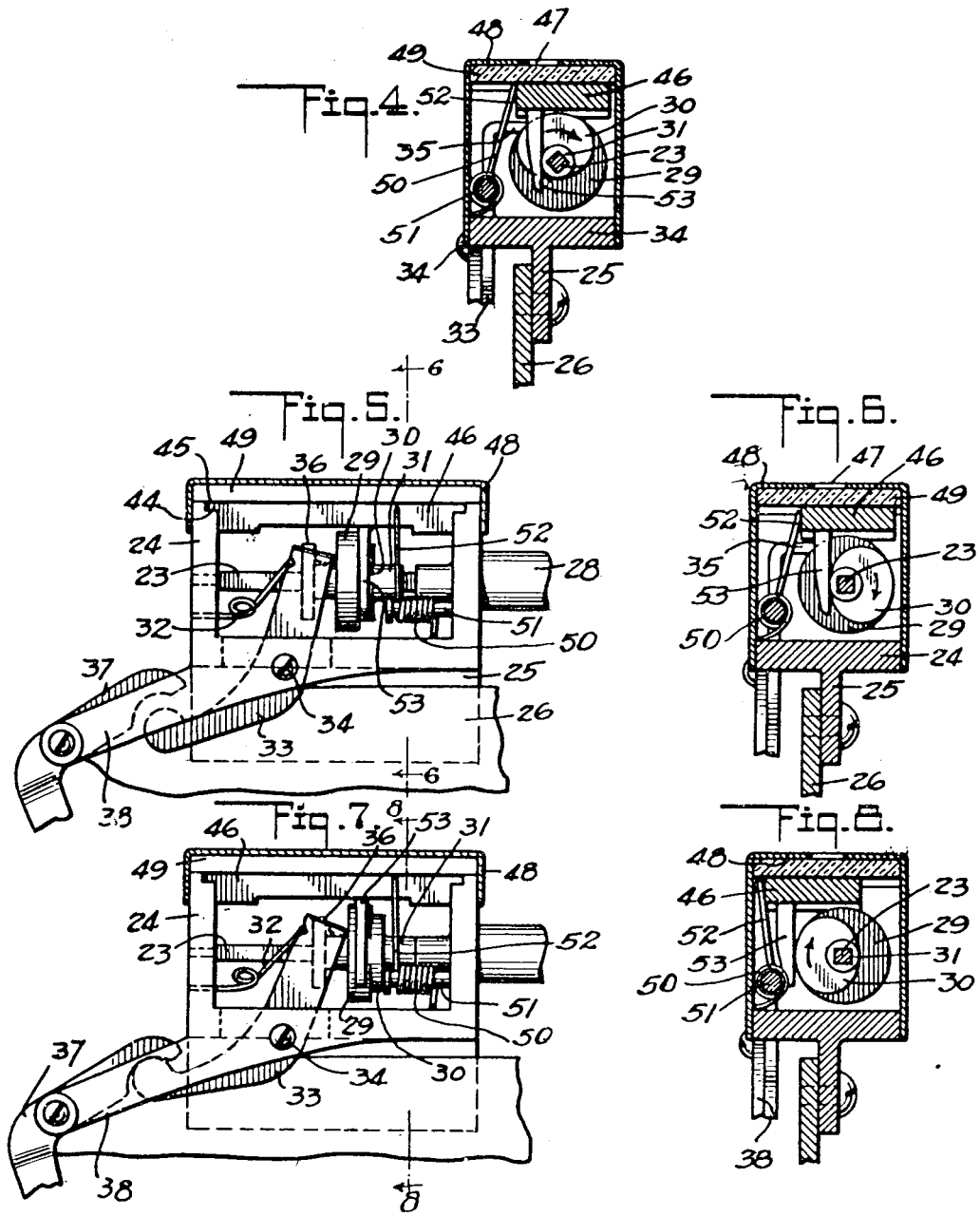

Patented Dec. 25, 1928.

1,696,533

UNITED STATES PATENT OFFICE.

FRED W. GAGE, OF LOS ANGELES, AND ALBERT W. TONDREAU, OF GLENDALE, CALIFORNIA.

FILM SIGNALING DEVICE FOR CAMERAS.

Application filed April 20, 1926. Serial No. 103,328.

Our invention relates to signaling devices for cameras, for indicating whether a film frame has or has not been exposed, so as to preclude the double exposing of the film frame or the non-exposing thereof.

A purpose of our invention is the provision of a film signaling device of the above described character which is capable of being applied to cameras of conventional construction with only a slight structural modification of the present camera, and which when applied operates through opening of the shutter to signal or indicate when a particular film frame has been exposed, the device being operable upon actuation of the film winding mechanism to move a film frame into position to signal or indicate that the new film frame has not been exposed. In this manner, the device is automatically operable to indicate the condition of a film frame with regard to exposure, so that the double or blank exposure of film frames is precluded.

We will describe only one form of film signaling device embodying our invention and its adaptation to a conventional form of camera, and will then point out the novel features thereof in claims.

In the accompanying drawings.

Figure 1:
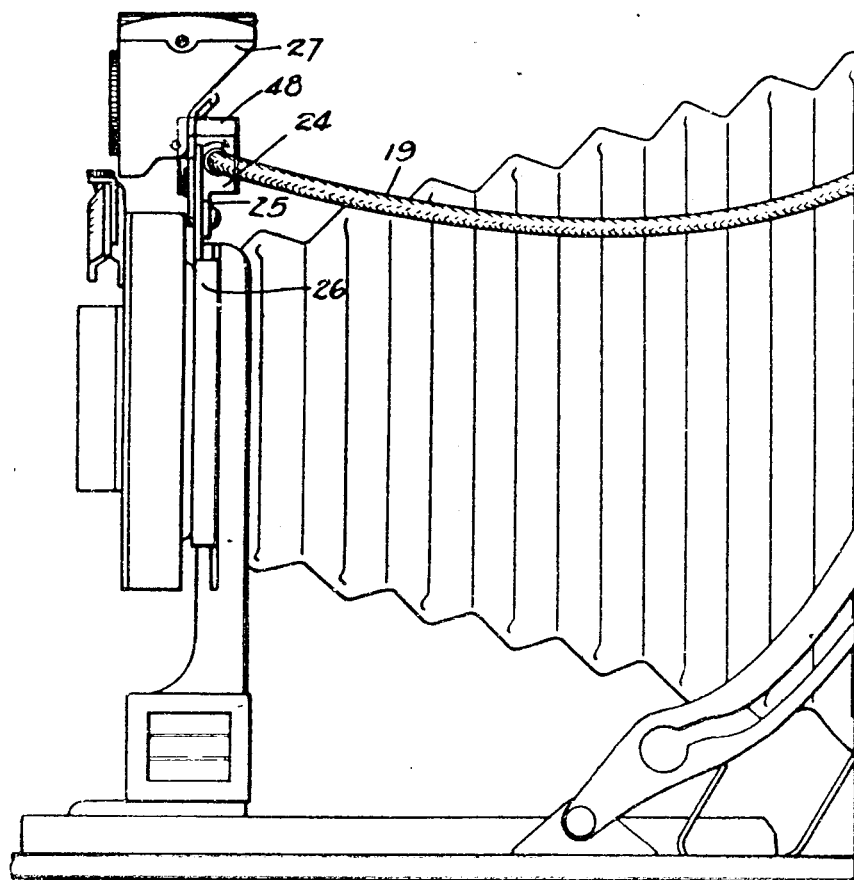
Figure 1 is a view showing in side elevation a camera having applied thereto one form of film signaling device embodying our invention.
Figure 1:
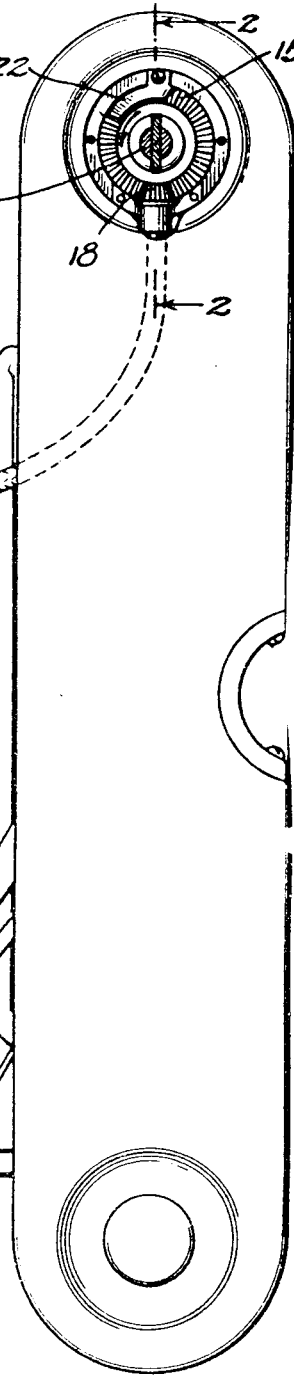
Figure 2:
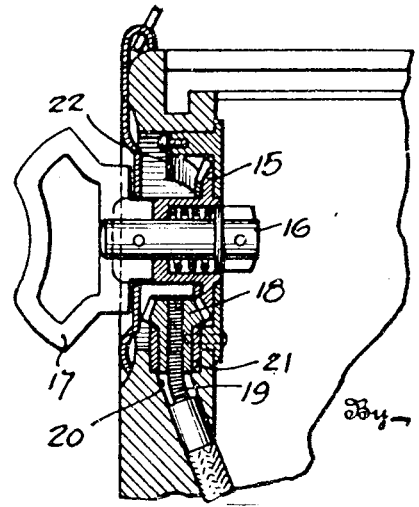
Figure 2 is an enlarged fragmentary sectional view taken on the line 2—2 of Figure 1.

Figure 2ᵃ is a fragmentary plan view of the camera shown in Figure 1 with a portion of the signaling device in applied position thereto;

Figure 3 is a view showing in front elevation the lens and shutter mechanism of the camera, with the signaling device applied thereto and partly in section;

Figure 4 is a vertical sectional view taken on the line 4—4 of Figure 3;

Figure 5 is an enlarged view showing the signaling device in front elevation and in one of the positions which it is adapted to occupy;

Figure 6 is a vertical sectional view taken on the line 6—6 of Figure 5;

Figure 7 is a view similar to Figure 5, showing another position which the signaling device is adapted to occupy;

Figure 8 is a sectional view taken on the line 8—8 of Figure 7.

Similar reference characters refer to similar parts in each of the several views.

Referring specifically to the drawings, our invention, in its present embodiment, is shown applied to a conventional form of folding camera having the usual film winding means and shutter actuating mechanism. The signaling device comprises a bevel gear 15 (Figure 2) having a splined connection with a stub shaft 16, the latter being conventional and adapted for actuation by a key 17 to rotate the film winding reel (not shown). Through the medium of the key 17 the gear 15 is rotated during the film winding operation to actuate a pinion 18 constantly meshing therewith and operatively connected to one end of the flexible shaft 19 extending into a suitable opening 20 formed in one side of the camera casing. A collar 21 is secured within the casing to form a rotatable support for the pinion 18 and to maintain the latter in meshing relation to the gear 15. As shown in Figure 1, a pawl 22 engages the gear 15 so as to permit rotation of the latter in one direction only or in that direction in which the film reel is rotated to cause winding of the film thereon.

The flexible shaft 19 is extended forwardly from the camera casing for operative connection with a shaft 23 journaled in a U-shaped frame 24. As clearly shown in Figures 4 and 5, the frame 24 is provided with a depending lip 25 which is secured to the lens board 26 of the camera and in such position as to be in relatively close proximity to the finder 27 of the camera so as to be practically within the range of vision of the operator when looking into the finder. This frame 24 is provided with a bearing 28 in which the rounded end portion of the shaft 23 is journaled, the remainder of the shaft, with the exception of the opposite end thereof, being squared in cross section and having mounted thereon a plurality of cam members integrally formed with respect to each other and slidable longitudinally on the shaft and rotatable therewith. By referring to Figures 4 to 8, inclusive, the construction of this cam member will be apparent. One cam member 29 is of disk form and concentrically mounted on the shaft 23. At the right side of this cam member 29 is a second cam member 30 of ovate form and disposed eccentrically with respect to the shaft 23 in such manner that its high point is flush with the periphery of the cam member 29. The third cam member 31 is greatly reduced in diameter with respect to the other cam members, and it is disposed concentrically of the shaft 23 in such manner that a portion of the periphery of the cam member 30 is flush with a portion of the cam member 31.

The three cam members constitute a cam unit which is movable longitudinally on the shaft 23 to occupy two extreme positions and an intermediate position. The cam unit is normally urged to one extreme position or to the position shown in Figure 7 by means of a spring 32 interposed between one end of the frame 24 and the upper end of a lever 33 fulcrumed in the frame at the point indicated at 34 and extending upwardly through a suitable slot formed in the bottom of the frame. This lever 33 is provided at its upper end with an angularly disposed finger 35 which engages a shifting collar 36, formed integral with the cam 29. In this manner the retraction of the spring 32 is permitted through the lever, finger and shifting collar to the cam unit, so that the latter normally occupies the position shown in Figure 3. The lower end of the lever 33 is in the path of movement of an actuating lever 37 fulcrumed on an extension 38 of the frame 24 and extending downwardly through an opening 39 in the casing for the shutter operating mechanism so that its lower end is in engagement with a cam strap 40 movable vertically by an eccentric 41 constituting part of a conventional shutter operating mechanism. The shutter operating mechanism is adapted to be set by movement of a lever 42 and to be actuated to effect the exposure of a film by movement of a lever 43.

As shown in Figure 5, the upper ends of the sides of the frame 24 are formed with grooves 44 in which are slidable tongues 45 formed on the ends of a signaling plate 46. In this manner, the signaling plate is mounted for sliding movement within the frame to occupy either of two extreme positions. In one position of the plate the legend "Exposed" is displayed within the slot 47 of a cover 48, while in the other extreme position the legend "Unexposed" is displayed within the slot. These two legends are printed or otherwise affixed to the signaling plate and when one is displayed the other is concealed, as will be clear by referring to Figure 2ª. Interposed between the cover 48 and the signaling plate is a glass plate 49 constituting a window through which the legends can be seen when displayed within the slot. The cover 48 extends downwardly to opposite sides of the frame 24 so as to completely enclose the mechanism within the frame.

The signaling plate 46 is normally urged rearwardly to the position shown in Figure 6 by means of a spring 50 mounted on a stud 51 of the frame 24 and having an upwardly extending finger 52 which engages the forward edge of the signaling plate, as shown. In this rearmost position of the signaling plate, the legend "Exposed" is displayed, but when the plate is moved to its foremost position, as shown in Figure 8, the legend "Unexposed" is displayed. To move the signaling plate to either of these signaling positions, an arm 53 is fixed to the plate to be acted upon by the cam until in accordance with movements of the latter, is controlled by rotation of the shaft 23 through the film winding means, and actuation of the lever 33 through the shutter operating mechanism. The arm 53 is disposed to engage the peripheries of the cam members.

The operation of the signaling devices is as follows: Let it be assumed that the lever 43 has just been moved to actuate the shutter to expose a film frame. The signaling plate now occupies the position shown in Figure 4, in which the legend "Exposed" is displayed, thus indicating to the operator that the film frame has been exposed. In this position of the signaling plate, the cam unit occupies the position shown in Figure 3, in which the arm 53 is in engagement with the periphery of the small cam member 31, and further in engagement with the adjacent side of the cam member 30, so as to hold the cam unit against further movement to the right as when viewed in Figure 3, under the action of the spring 32. Upon actuation of the film winding key 17 to bring a new film frame into position, the shaft 23 is rotated in a clockwise direction as when viewed in Figure 4, thereby rotating the cam unit until that portion of the cam member 31 which is flush with the periphery of the cam member 30 is opposite the arm 53 when the arm no longer serves to prevent movement of the cam unit under the action of the spring 32, so that the cam unit is moved bodily to the position shown in Figure 5. In this position of the cam unit, the arm 53 is disposed on the periphery of the cam member 30 and in contact with the adjacent side of the cam member 29. Upon continued rotation of the shaft 23, the cam member 30 is actuated to move the arm 53 forwardly against the tension of the spring finger 52 carrying with it the signaling plate 46, so that when the arm has reached the highest point of the cam member the plate has been returned to its foremost position shown in Figure 8, in which the legend "Unexposed" is now displayed. As the arm 53 reaches the highest point on the cam member 30, such portion of the cam member being flush with the periphery of the cam member 29 prevents the arm from further restricting lateral movement of the cam unit so that the latter moves to the position shown in Figure 7 under the action of the spring 32. It will be understood that during the described movement of the cam unit to the right, the lever 33 is correspondingly moved, so that its lower end is now in contact with the upper end of the lever 37.

It is important to note that the movement of the signaling plate to "Unexposed" signaling position occurs with the initial movement of the film winding key 17, the rotation of the shaft 23 being relatively rapid to cause quick actuation of the cam members in moving the arm 53 to its foremost position. By actuating the signaling plate with initial winding of the film, it will be manifest that subsequent winding movement is ineffective to actuate the signaling device, thus permitting the device to be used in connection with films having frames of different lengths.

Upon completion of the film winding movement to move the new film frame into position, the cam is now ready for a succeeding operation, with the signaling device clearly indicating that that film frame is unexposed. By first setting the shutter through actuation of the lever 42, the shutter is actuated to expose the film frame by operation of the lever 43, and during such operation the strap 40 is elevated under the rotative movement of the eccentric 41 to elevate the lower end of the lever 47 and thus actuate the lever 33. The lever 33 is moved from the position shown in Figure 7 to the position shown in Figure 3, and through the finger 35 on the shifting collar 36 to move the cam against the tension of the spring 32 to the left hand extreme position shown in Figure 3. The arm 53 does not interfere with the just described movement of the cam unit as the cams are not rotated but merely shifted laterally, and hence the arm slides from one cam member to the other under the action of the spring 50 until it engages the cam 31. During this movement of the arm 53, the signaling plate 46 is returned to its rearmost position, in which the legend "Exposed" is now displayed. In this manner, the signaling device is actuated to indicate that the film frame has been exposed following an operation of the shutter.

Although we have herein described and shown only one form of film signaling device embodying our invention, it is to be understood that various changes and modifications may be made therein without departing from the spirit of the invention and the spirit and scope of the appended claims.

We claim as our invention:

1. A film signal device for cameras comprising a signal element movable to occupy two signaling positions, yieldable means for urging the signal element to one signaling position, means for moving the signal element to and maintaining it in the other signaling position, means adapted for operation by a shutter mechanism for rendering the second means ineffective to maintain the signal element in the other signaling position, and means adapted for operation by a film winding means for actuating the second means to return the signal element to the other signaling position, the second means being capable of lateral movement by the third means to render the second means ineffective, and capable of rotary movement by the fourth means to return the signal element to the other signaling position.

2. A film signal device for cameras comprising a signal element mounted for sliding movement to occupy either of two signaling positions, means for urging the signal element to one signaling position, a plurality of rotary members of graduated diameters movable together and laterally to occupy either of two extreme positions and urged to one extreme position, an arm fixed to the signaling element and normally engaging the member of smallest diameter to retain the rotary members in the non-urged positions whereby the signaling element can assume its urged position, means for rotating the members whereby the arm is actuated to successively engage and disengage the members under the lateral urging action of the members, thus moving the signal element to the non-urged signaling position and allowing the members to return to urged position, and means adapted for operation by a shutter mechanism for restoring the rotary members to the non-urged position wherein the signaling element is free to move to urged position.

3. In a film signal device for cameras, a frame, a signaling plate adapted to occupy either of two signaling positions and urged to one signal position, a shaft journaled in the frame, a plurality of integral cams mounted on the shaft for rotation therewith but movable longitudinally thereon, said cams being of graduated diameters with portions of their peripheries in flush relation to each other, means for urging the cams to one extreme position longitudinally on the shaft, an arm fixed to the signaling plate and normally bearing on the periphery of the smallest cam and engaging the next adjacent cam to retain all of the cams in non-urged position, means adapted for operation by a film winding means for rotating the shaft to rotate the cams, whereby said arm is caused to successively engage the cams under the action of said urging means until the arm engages the periphery of the largest cam whereby the arm is actuated to move the signal plate to the non-urged position, and means adapted for operation by a shutter mechanism for moving the cams longitudinally on the shaft in the other direction to permit movement of the arm and thus the return of the signaling plate to urged position.

4. A film signal device for cameras comprising a frame, a cover for the frame having a slot therein, a transparent window for the slot, a signaling plate slidable in the frame beneath the window, and bearing two legends, said plate being capable of movement to either of two extreme positions in which one legend or the other is displayed in said slot, a squared shaft journaled in the frame and adapted for operative connection to a film winding means so that when said means is actuated the shaft will be rotated, a spring in the frame for yieldably urging the signaling plate to one extreme position, a cam unit mounted on and rotatable with the shaft and capable of lateral movement longitudinally in either direction on said shaft, said cam unit comprising a relatively large concentric cam, an ovate cam eccentric to the shaft and smaller in diameter than the first cam, and a third cam concentric with the shaft and of less diameter than the second cam, said cams being arranged so that portions of their peripheries are flush with those of adjacent cams, an arm fixed to the signaling plate and adapted to bear against the peripheries of the cams and to engage the sides of the first two cams to limit the movement of the cam unit in one direction on said shaft, a shifting collar carried by the cam unit, a lever engaging within the collar, a spring engaging the lever to normally urge the cam unit in one direction on said shaft, and means by which said lever is adapted for operation by the shutter mechanism of a camera to move the cam unit on the shaft and against the action of said spring.

5. A film signaling device as embodied in claim 4 wherein the means adapted for operation by a film winding means comprises gears and a flexible shaft providing an operative connection between the gears and the squared shaft.

6. A film signal device for cameras comprising a signal element mounted for movement to occupy either of two signaling positions, means for urging the signal element to one signaling position, a plurality of rotary members movable together and laterally to occupy either of two extreme positions and urged to one extreme position, means secured to the signaling element and normally engaging one of the members to retain the members in their non-urged position whereby the signal element is free to assume its urged position, means for rotating the members whereby the last said means is actuated to successively engage and disengage the members under the lateral urging action of the members, thus moving the signal element to the non-urged signaling position and allowing the members to return to urged position, and means adapted for operation by a shutter mechanism for restoring the members to their non-urged position wherein the signaling element is free to move to its urged position.

7. A film signal device as embodied in claim 6 wherein two of the members are of disk form disposed in side by side relation and are of respectively different diameters, and the other member is in the form of a peripheral cam interposed between the disks and having a portion of its cam surface merging into the periphery of one of the disks and another portion of its cam surface merging into the periphery of the other disk.

FRED W. GAGE.
ALBERT W. TONDREAU.